(12) United States Patent
Sarma et al.

(10) Patent No.: US 12,484,089 B2
(45) Date of Patent: Nov. 25, 2025

(54) SYSTEMS, METHODS, AND DEVICES FOR PROTECTION MANAGEMENT-BASED COEXISTENCE ENHANCEMENT IN WIRELESS DEVICES

(71) Applicant: Cypress Semiconductor Corporation, San Jose, CA (US)

(72) Inventors: Munukutla Sandeep Sarma, Bangalore (IN); Suprojit Mukherjee, Nadia (IN); Raghavendra Kencharla, Bangalore (IN); Ayush Sood, Bengaluru (IN)

(73) Assignee: Cypress Semiconductor Corporation, San Jose, CA (US)

( * ) Notice: Subject to any disclaimer, the term of this patent is extended or adjusted under 35 U.S.C. 154(b) by 398 days.

(21) Appl. No.: 18/082,947

(22) Filed: Dec. 16, 2022

(65) Prior Publication Data

US 2024/0205969 A1  Jun. 20, 2024

(51) Int. Cl.
*H04W 74/0816* (2024.01)
*H04W 74/08* (2024.01)

(52) U.S. Cl.
CPC ... *H04W 74/0816* (2013.01); *H04W 74/0866* (2013.01)

(58) Field of Classification Search
CPC .............. H04W 74/0816; H04W 74/0866
See application file for complete search history.

(56) References Cited

U.S. PATENT DOCUMENTS

| | | | |
|---|---|---|---|
| 11,601,922 B1* | 3/2023 | Chu | H04W 72/121 |
| 2006/0165114 A1* | 7/2006 | Diepstraten | H04W 28/26 370/473 |
| 2006/0203841 A1* | 9/2006 | Fischer | H04W 16/14 370/461 |
| 2015/0049680 A1* | 2/2015 | Jeffery | H04W 74/0816 370/329 |

* cited by examiner

*Primary Examiner* — James P Duffy (57) ABSTRACT

Systems, methods, and devices enhance performance of collocated transceivers in wireless devices. Methods include identifying, using a processing device, an assertion of a radio frequency (RF) active signal, canceling activity of a first transceiver in response to identifying the assertion of the RF active signal, the RF active signal being associated with a second transceiver collocated with the first transceiver, and generating, using the processing device, a network allocation vector (NAV) reset signal in response to identifying a de-assertion of the RF active signal, the NAV reset signal resetting a timer of a wireless device comprising the first transceiver and the second transceiver.

20 Claims, 6 Drawing Sheets

SYSTEMS, METHODS, AND DEVICES FOR PROTECTION MANAGEMENT-BASED COEXISTENCE ENHANCEMENT IN WIRELESS DEVICES

TECHNICAL FIELD

This disclosure generally relates to wireless devices, and more specifically, to enhancement of coexistence of transceivers in such wireless devices.

BACKGROUND

Wireless devices may communicate with each other via one or more wireless modalities, such as a Wi-Fi connection or a Bluetooth connection. Accordingly, such wireless communication may be implemented in a manner compliant with a wireless protocol. Moreover, such wireless devices may include various hardware components to facilitate such communication. For example, wireless devices may include transmission media that may include one or more antennas. Conventional techniques for handling activity of collocated wireless radios remain limited because they are not able to efficiently facilitate sharing of a communications medium while reducing issues of underprotection and over-protection of medium usage.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless devices may include multiple transceivers that are collocated. More specifically, they may be included in the same wireless device, and may share one or more components of the wireless device, such as components of processing logic as well as components of a communications medium, such as an antenna. Accordingly, coexistence techniques are used to manage shared access to such resources. In one example, the wireless devices may be low energy devices using low energy and/or cost-efficient components. Such low energy devices may use techniques such as time division multiplexing (TDM) techniques. Such conventional coexistence techniques are limited because they rely on estimations of wireless activity, and are not able to precisely tailor protection operations to actual activity occurring on a communications medium. Accordingly, conventional techniques can result in underprotection or overprotection of traffic on shared communications media, and are thus inefficient in their usage of the communications media.

Embodiments disclosed herein enable the use of protection frames and control frames to improve the efficiency of communications medium usage by collocated transceivers. As will be discussed in greater detail below, control frames may be used to selectively reset one or more components of wireless devices in response to the termination of a radio frequency (RF) active signal thus triggering the return of access to a communications medium to one of the transceivers. In this way, wireless devices configured as disclosed herein are able to precisely time the allocation of communications medium usage based on dynamic activity of the collocated transceivers, thus improving efficiency of the overall usage of the communications medium as well as data throughput of the communications medium.

Figure 1:
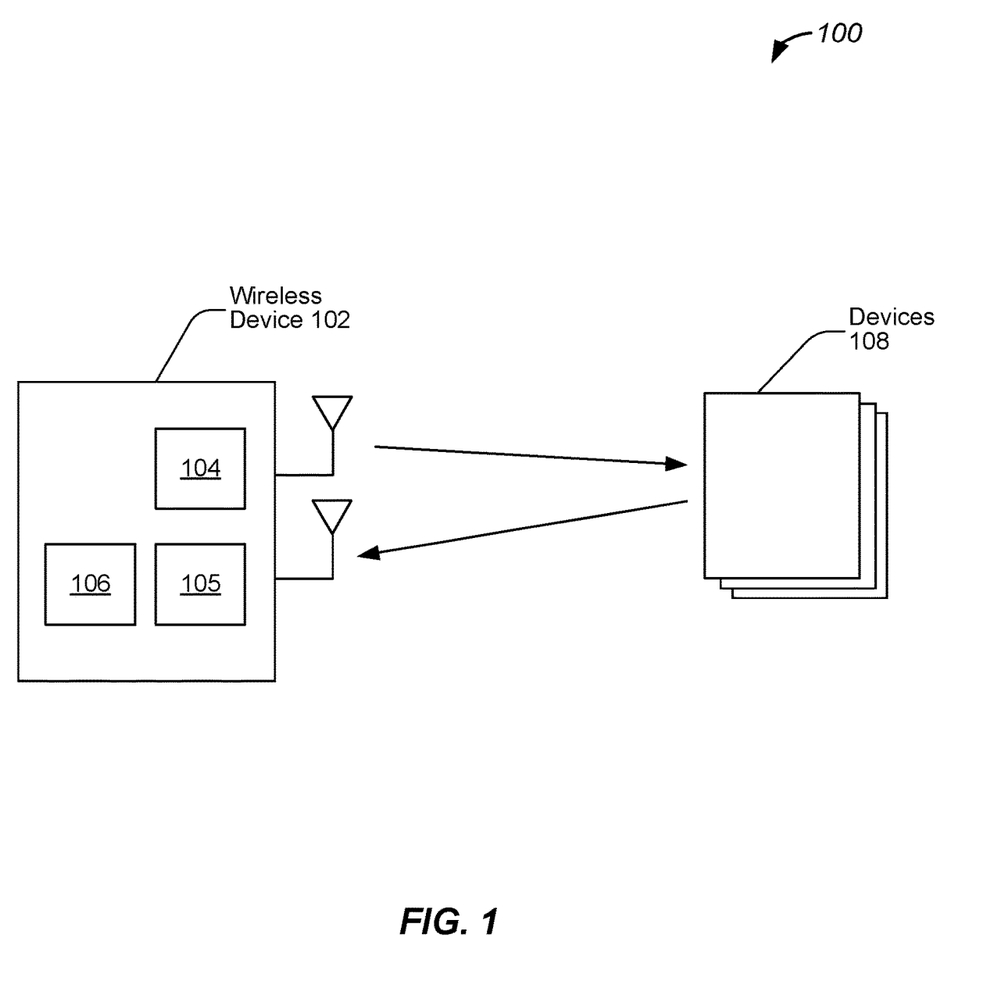
FIG. 1 illustrates an example of a system for coexistence enhancement, configured in accordance with some embodiments.

FIG. 1 illustrates an example of a system for coexistence enhancement, configured in accordance with some embodiments. Accordingly, a system, such as system 100, may include wireless devices that are used for wireless communications, and are also configured to be able to perform coexistence operations as disclosed herein. Accordingly, as will be discussed in greater detail below, wireless devices included in system 100 may be configured to utilize one or more control frames to improve the efficiency of medium usage, and reduce issues of underprotection and overprotection.

In various embodiments, system 100 may include wireless device 102 which may be a wireless communications device. As discussed above, such wireless devices may be compatible with one or more wireless transmission protocols, such as a Wi-Fi protocol or a Bluetooth protocol. In some embodiments, wireless device 102 includes collocated radios. For example, wireless device 102 may include a Wi-Fi radio and a Bluetooth radio that share access to a communications medium. In one example, are Bluetooth devices. For example, wireless device 102 may include a first transceiver, such as transceiver 104, and a second transceiver, such as transceiver 105. Transceiver 104 may be compatible with a Wi-Fi specification and protocol, and transceiver 105 may be compatible with a Bluetooth specification and protocol. For example, the Bluetooth protocol may be a Bluetooth Low Energy (BLE) protocol, also referred to as Bluetooth Smart. In some embodiments, wireless device 102 may be a smart device, such as those found in wearable devices, or may be a monitoring device, such as those found in smart buildings, environmental monitoring, and energy management. It will be appreciated that such wireless devices may be any suitable device, such as those found in cars, other vehicles, and even medical implants.

As shown in FIG. 1, various wireless communications devices may be in communication with each other via one or more wireless communications mediums. Moreover, wireless device 102 may each include one or more antennas, and may also include processing device 106. As discussed above, wireless device 102 may also include collocated transceivers, such as transceiver 104 and transceiver 105. As disclosed herein a transceiver as well as its associated transmit and receive chains and processing logic may be referred to as a radio. As will be discussed in greater detail below, such processing devices, transceivers, and radios may be configured to establish communications connections with other devices, and transmit data in the form of data packets via such communications connections. Accordingly, wireless devices, such as wireless device 102, are configured to utilize one or more control frames to improve the efficiency of medium usage.

In some embodiments, system 100 may further include devices 108 which may also be wireless devices. As similarly discussed above, devices 108 may be compatible with one or more wireless transmission protocols, such as a Wi-Fi protocol or a Bluetooth protocol. In some embodiments, devices 108 may be configured as stations in communication with wireless device 102. For example, devices 108 may be smart devices or other devices, such as those found in gaming systems, cars, other vehicles, and medical implants. In various embodiments, devices 108 may be different types of devices than wireless device 102. As discussed above, each of devices 108 may include one or more antennas, as well as processing devices and transceivers, which may also be configured to establish communications connections with other devices, and transmit data in the form of data packets via such communications connections. As discussed above, devices 108 may also be configured to utilize one or more control frames to improve the efficiency of medium usage.

Figure 2:
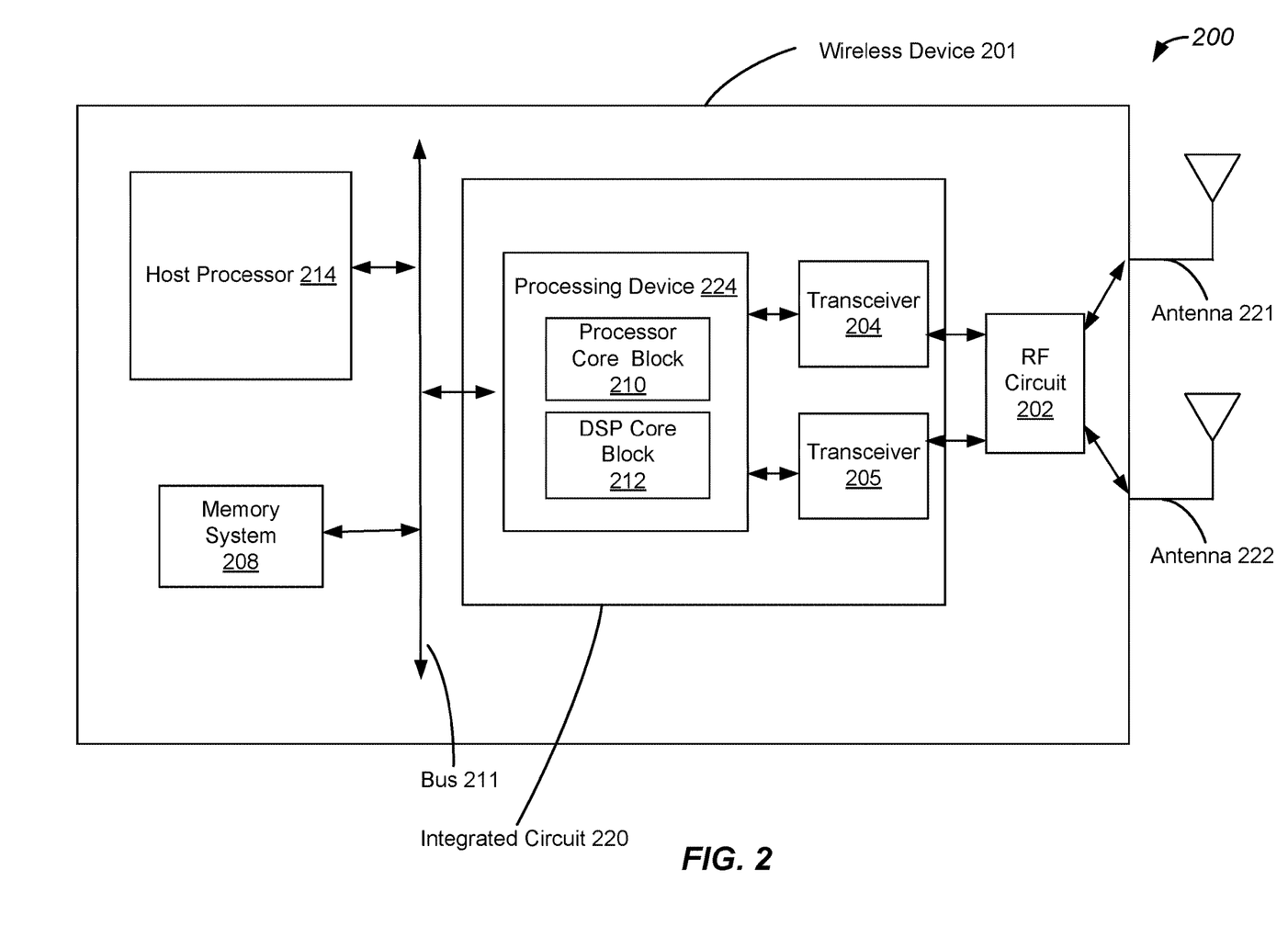
FIG. 2 illustrates an example of a device for coexistence enhancement, configured in accordance with some embodiments.

FIG. 2 illustrates an example of a device for coexistence enhancement, configured in accordance with some embodiments. More specifically, FIG. 2 illustrates an example of a system, such as system 200, that includes wireless device 201. It will be appreciated that wireless device 201 may be one of any of the wireless devices discussed above with reference to FIG. 1, such as wireless device 102 and devices 108.

In various embodiments, wireless device 201 includes one or more transceivers, such as transceiver 204 and transceiver 205. In one example, system 200 includes transceiver 204 which is configured to transmit and receive signals using a communications medium that may include antenna 221 or antenna 222. As noted above, transceiver 204 may be a Wi-Fi transceiver. Accordingly, transceiver 204 may be compatible with a Wi-Fi communications protocol. It will be appreciated that while some examples describe Wi-Fi transceivers, any suitable wireless local area network (WLAN) transceiver. Accordingly, transceiver 204 may be any type of WLAN transceiver. In various embodiments, transceiver 204 includes a modulator and demodulator as well as one or more buffers and filters, that are configured to generate and receive signals via antenna 221 and/or antenna 222.

System 200 additionally includes transceiver 205 which may be collocated with transceiver 204 in wireless device 201. In various embodiments, transceiver 205 is also be configured to transmit and receive signals using a communications medium that may include antenna 221 or antenna 222. Accordingly, transceiver 205 may be a Bluetooth transceiver compatible with a Bluetooth communications protocol. In one example, the Bluetooth protocol may be a Bluetooth Low Energy (BLE) protocol. Moreover, transceiver 205 includes a modulator and demodulator as well as one or more buffers and filters, that are configured to generate and receive signals via antenna 221 and/or antenna 222. While various embodiments are described with reference to Bluetooth and Wi-Fi communications protocols, it will be appreciated that any suitable protocol may be used.

In various embodiments, system 200 further includes processing device 224 which may include logic implemented using processing elements and/or one or more processor cores. Accordingly, processing device 224 is configured to perform the generation of frames and medium access management operations, as will be discussed in greater detail below. More specifically, processing elements included in processing device 224 may be configured to implement a packet traffic arbiter that may be configured to perform protection and control frame management and medium access management operations as disclosed herein. In some embodiments, the packet traffic arbiter may be implemented in firmware included in processing device 224.

Moreover, processing device 224 includes one or more components configured to implement a medium access control (MAC) layer that is configured to control hardware associated with a wireless transmission medium, such as that associated with a Wi-Fi transmission medium. In one example, processing device 224 may include processor core block 210 that may be configured to implement a driver, such as a Bluetooth and/or Wi-Fi driver. Processing device 224 may further include digital signal processor (DSP) core block 212 which may be configured to include microcode.

In various embodiments, processor core block 210 comprises multiple processor cores which are each configured to implement specific portions of a wireless protocol interface. For example, a Bluetooth protocol may be implemented using a Bluetooth stack in which software is implemented as a stack of layers, and such layers are configured to compartmentalize specific functions utilized to implement the Bluetooth communications protocol. In various embodiments, a host stack includes layers for a Bluetooth network encapsulation protocol, radio frequency communication, service discovery protocol, as well as various other high level data layers. Moreover, a controller stack includes a link management protocol, a host controller interface, a link layer which may be a low energy link layer, as well as various other timing critical layers.

System 200 further includes radio frequency (RF) circuit 202 which is coupled to antenna 221 and antenna 222. In various embodiments, RF circuit 202 may include various components such as an RF switch, a diplexer, and a filter. While FIG. 2 illustrates system 200 as having two antennas, it will be appreciated that system 200 may have a single antenna, or any suitable number of antennas. Accordingly, RF circuit 202 may be configured to select an antenna for transmission/reception, and may be configured to provide coupling between the selected antenna, such as antenna 221, and other components of system 200 via a bus, such as bus 211. While one RF circuit is shown, it will be appreciated that wireless device 201 may include multiple RF circuits. Accordingly, each of multiple antennas may have its own RF circuit. Moreover, each one may be associated with a particular wireless communications protocol, such as a first antenna and RF circuit for Wi-Fi and a second antenna and RF circuit for Bluetooth.

System 200 includes memory system 208 which is configured to store one or more data values associated with frame management and medium access management operations discussed above and in greater detail below. Accordingly, memory system 208 includes storage device, which may be a non-volatile random access memory (NVRAM) configured to store such data values, and may also include a cache that is configured to provide a local cache. In various embodiments, system 200 further includes host processor 214 which is configured to implement processing operations implemented by system 200.

It will be appreciated that one or more of the above-described components may be implemented on a single chip, or on different chips. For example, transceiver 204, transceiver 205, and processing device 224 may be implemented on the same integrated circuit chip, such as integrated circuit chip 220. In another example, transceiver 204, transceiver 205, and processing device 224 may each be implemented on their own chip, and thus may be disposed separately as a multi-chip module or on a common substrate such as a printed circuit board (PCB). It will also be appreciated that components of system 200 may be implemented in the context of a low energy device, a smart device, or a vehicle such as an automobile. Accordingly, some components, such as integrated chip 220, may be implemented in a first location, while other components, such as antenna 221, may be implemented in second location, and coupling between the two may be implemented via a coupler such as RF circuit 202.

Figure 3:
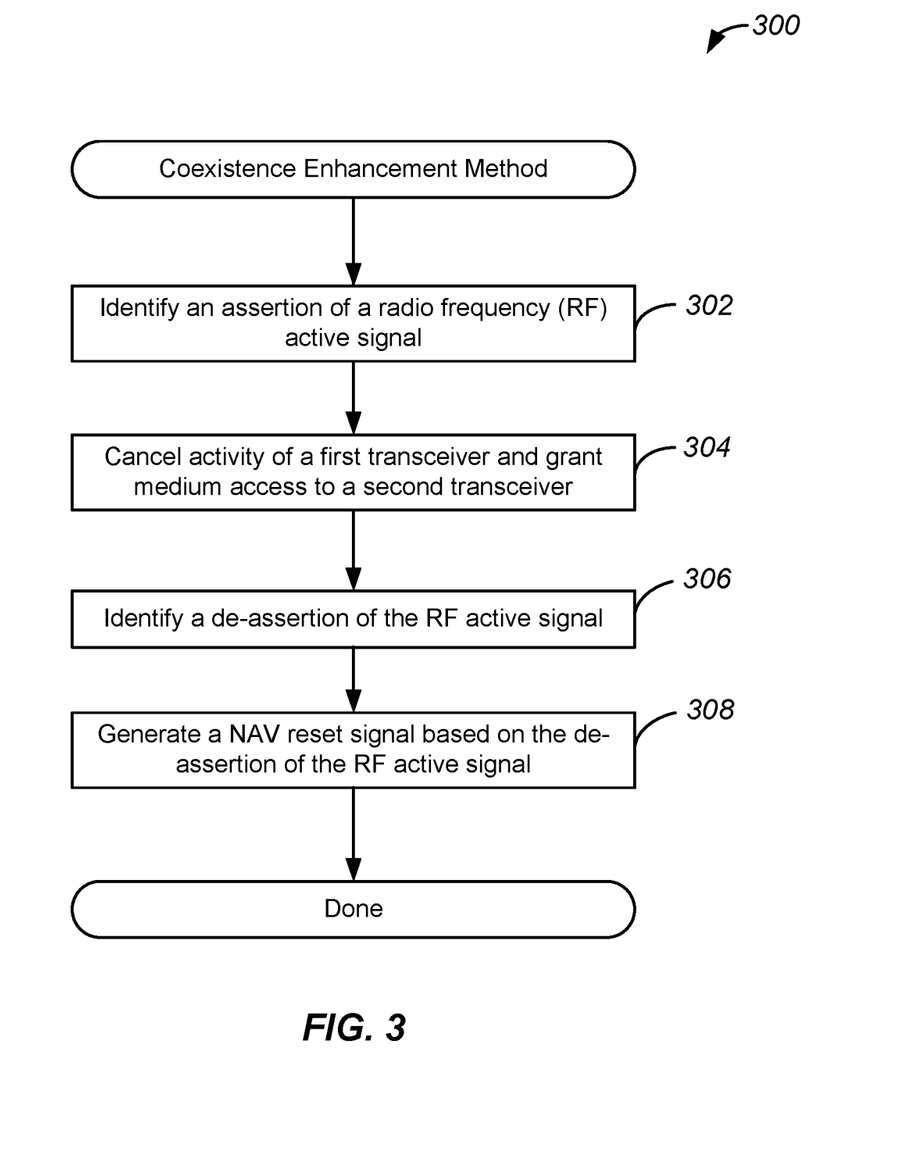
FIG. 3 illustrates an example of a method for coexistence enhancement, performed in accordance with some embodiments.

FIG. 3 illustrates an example of a method for coexistence enhancement, performed in accordance with some embodiments. Accordingly, a method, such as method 300, may be performed to facilitate coexistence operations as disclosed herein. Thus, as will be discussed in greater detail below, method 300 may be performed to utilize one or more control frames to improve the efficiency of medium usage, and reduce issues of underprotection and overprotection.

Method 300 may perform operation 302 during which an assertion of a radio frequency (RF) active signal may be identified. As similarly discussed above, a collocated transceiver may assert an RF active signal to request medium access in anticipation of a transmit or receive operation. In one example, the collocated transceiver may be a Bluetooth transceiver that is requesting medium access from another component of a wireless device.

Method 300 may perform operation 304 during which activity of a first transceiver may be canceled. Accordingly, in response to receiving the RF active signal, activity of another collocated transceiver, which may be a Wi-Fi transceiver, may be canceled, and medium access may be granted to the other collocated transceiver, which may also be referred to as the second transceiver. As will be discussed in greater detail below, the cancellation of transceiver activity may also include the generation and transmission of a protection frame, such as a CTS-to-Self frame, that may include one or more fields, such as a duration field.

Method 300 may perform operation 306 during which a de-assertion of the RF active signal may be identified. Accordingly, the second transceiver may have completed one or more transmit and/or receive operations, and may terminate the RF active signal. The termination of the RF active signal may be detected by one or more components of the wireless device.

Method 300 may perform operation 308 during which a network allocation vector (NAV) reset signal may be generated based on the de-assertion of the RF active signal. In various embodiments, the NAV reset signal may be used to reset one or more components of the wireless device as well as components of peer devices. As will be discussed in greater detail below, the generation of the NAV reset signal may include the generation and transmission of a control frame, such as a CF-End frame. Thus, the CF-End frame may be used to reset the wireless device and peer devices, and to return medium access to the first transceiver prior to a termination of a duration specified by the protection frame discussed above. In this way, efficiency of medium usage may be increased, and data throughput may be increased.

Figure 4:
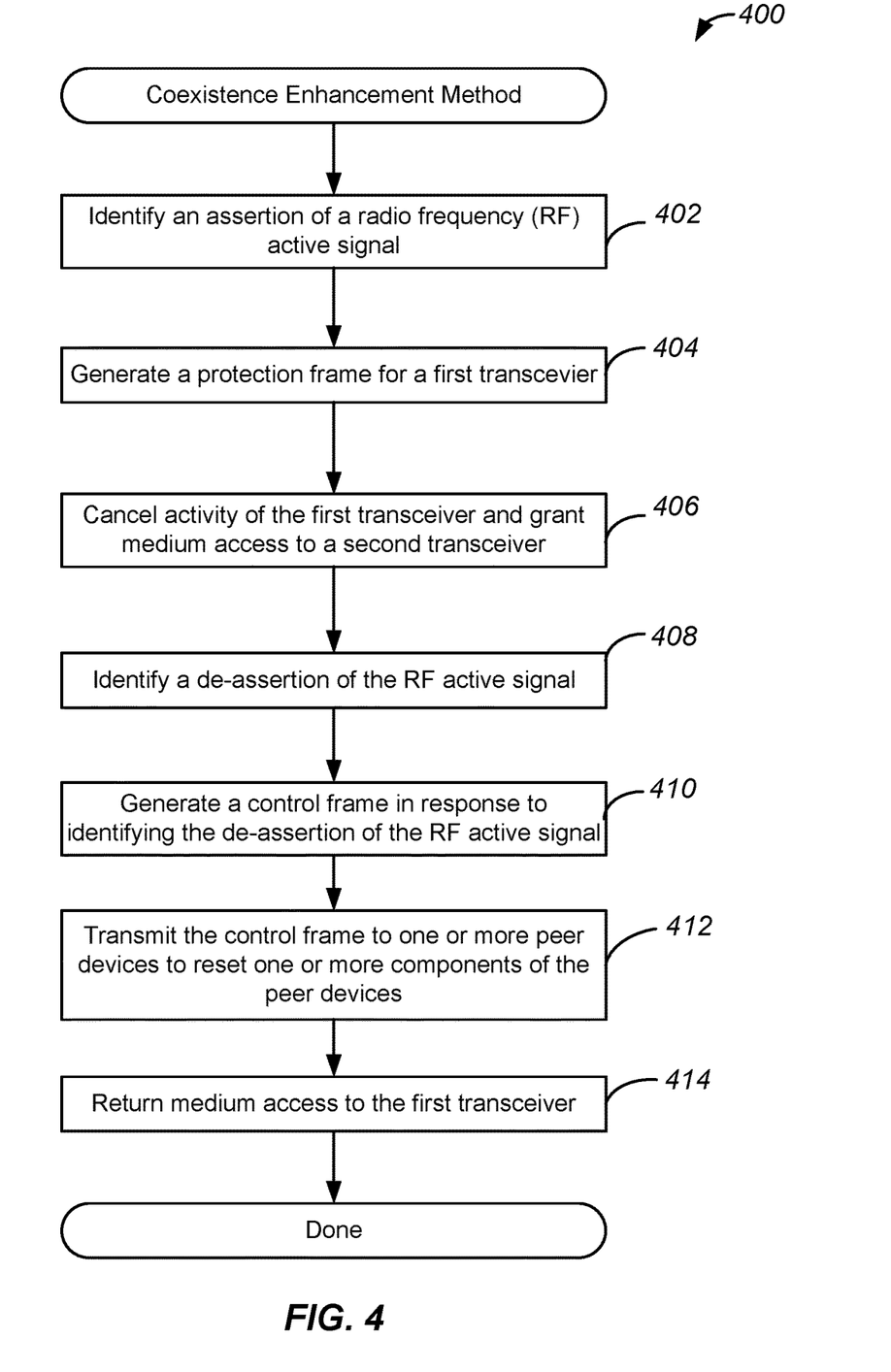
FIG. 4 illustrates another example of a method for coexistence enhancement, performed in accordance with some embodiments.

FIG. 4 illustrates another example of a method for coexistence enhancement, performed in accordance with some embodiments. Accordingly, a method, such as method 400, may be performed to facilitate coexistence operations as disclosed herein. Therefore, as will be discussed in greater detail below, method 400 may be performed to utilize one or more control frames to improve the efficiency of medium usage, and reduce issues of underprotection and overprotection.

Method 400 may perform operation 402 during which an assertion of an RF active signal may be identified. As similarly discussed above, a collocated transceiver may assert an RF active signal to request medium access in anticipation of a transmit or receive operation. In one example, the collocated transceiver may be a Bluetooth transceiver that is requesting medium access from another component of a wireless device. Accordingly, during operation 402, a Bluetooth transceiver may indicate that medium access is needed for one or more transmit and/or receive operations, and an RF active signal may be generated.

Method 400 may perform operation 404 during which a protection frame may be generated for a first transceiver. As discussed above, the protection frame may be a CTS-to-Self frame that includes one or more data fields. In various embodiments, the CTS-to-Self frame includes a duration field which identifies a duration of time for which medium access is suspended for the first transceiver and granted to the second transceiver. The CTS-to-Self frame may be sent to various peer devices, which may be stations, so that all devices are aware that medium access has been granted to the second transceiver during the period of time specified by the duration. The wireless devices may include NAV timers that are used to time the suspension of network access to the communications medium based on the period of time specified by the duration field. More specifically, the NAV timers may be used by peer devices to suspend their access to the communications medium for the duration of the period of time specified in the CTS-to-Self frame. Accordingly, during operation 404, the CTS-to-Self frame may be generated and sent to one or more peer devices.

Method 400 may perform operation 406 during which activity of the first transceiver may be canceled. Accordingly, activity of a collocated transceiver, which may be a Wi-Fi transceiver, may be canceled, and medium access may be granted to the collocated transceiver for which the RF active signal was generated, which may also be referred to as the second transceiver.

Method 400 may perform operation 408 during which a de-assertion of the RF active signal may be identified. Accordingly, the second transceiver may have completed one or more transmit and/or receive operations, and may terminate the RF active signal. The termination of the RF active signal may be detected by one or more components of the wireless device.

Method 400 may perform operation 410 during which a control frame may be generated in response to identifying the de-assertion of the RF active signal. As similarly discussed above, the control frame may be a CF-End frame. In various embodiments, the CF-End frame may be a control frame that announces the end of a contention free period. As will be discussed in greater detail below, the CF-End frame may also cause one or more operations in a receiving device, such as the reset of a NAV timer. In some embodiments, the generation of the CF-End frame may be triggered by the termination of the RF active signal.

Method 400 may perform operation 412 during which the control frame may be transmitted to one or more peer devices. Accordingly, the CF-End frame may be transmitted to and received by the peer devices, and one or more actions may be taken in response to receiving the CF-End frame, as will be discussed in greater detail below.

Method 400 may perform operation 414 during which medium access may be returned to the first transceiver. As similarly discussed above, the transmission of the CF-End frame may be used to reset the wireless device and peer devices. More specifically, the CF-End frame may cause the NAV timers of the devices to reset, and may cause the medium access to be returned to the first transceiver. In this way, the CF-End frame may be used to terminate suspension of medium access prior to the end of the period of time previously specified by the duration field, and thus reduce an amount of time allocated to the second transceiver where the second transceiver was not actually performing transmit and/or receive operations.

Figure 5:
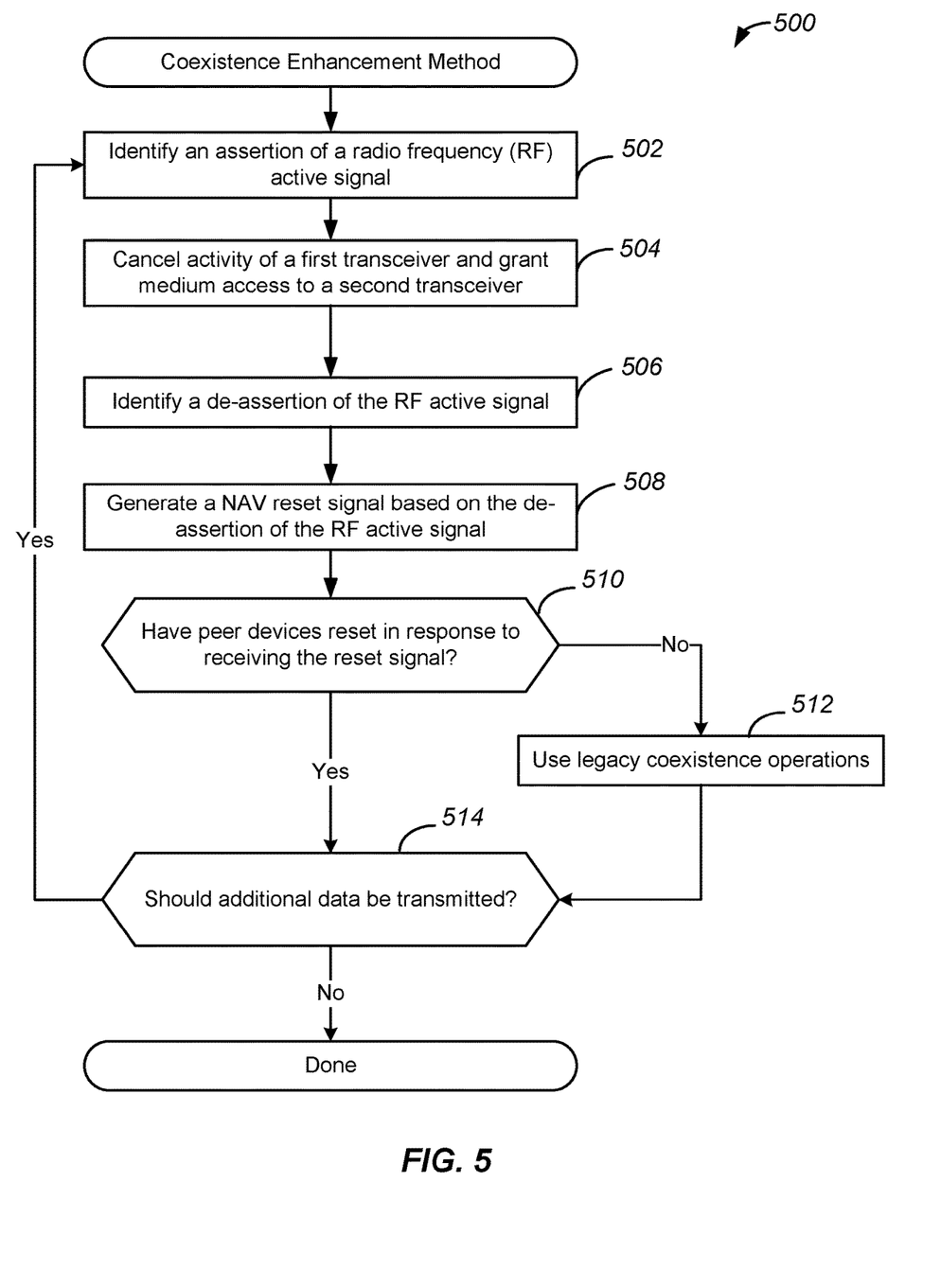
FIG. 5 illustrates yet another example of a method for coexistence enhancement, performed in accordance with some embodiments.

FIG. 5 illustrates yet another example of a method for coexistence enhancement, performed in accordance with some embodiments. Accordingly, a method, such as method 500, may be performed to facilitate coexistence operations as disclosed herein. Moreover, as will be discussed in greater detail below, method 500 may be performed to determine if coexistence operations should be utilized, as similarly discussed above, or l legacy coexistence operations should be used.

Method 500 may perform operation 502 during which an assertion of a radio frequency (RF) active signal may be identified. As similarly discussed above, a collocated transceiver may assert an RF active signal to request medium access in anticipation of a transmit or receive operation. In one example, the collocated transceiver may be a Bluetooth transceiver that is requesting medium access from another component of a wireless device.

Method 500 may perform operation 504 during which activity of a first transceiver may be canceled. Accordingly, in response to receiving the RF active signal, activity of another collocated transceiver, which may be a Wi-Fi transceiver, may be canceled, and medium access may be granted to the other collocated transceiver, which may also be referred to as the second transceiver. As similarly discussed above, the cancellation of transceiver activity may also include the generation and transmission of a protection frame, such as a CTS-to-Self frame, that may include one or more fields, such as a duration field.

Method 500 may perform operation 506 during which a de-assertion of the RF active signal may be identified. Accordingly, the second transceiver may have completed one or more transmit and/or receive operations, and may terminate the RF active signal. The termination of the RF active signal may be detected by one or more components of the wireless device.

Method 500 may perform operation 508 during which a NAV reset signal may be generated based on the de-assertion of the RF active signal. As similarly discussed above, the NAV reset signal may be used to reset one or more components of the wireless device as well as components of peer devices. Moreover, the generation of the NAV reset signal may include the generation and transmission of a control frame, such as a CF-End frame. Thus, the CD-End frame may be used to reset NAV timers of the wireless device and peer devices, and to return medium access to the first transceiver prior to a termination of a duration specified by the protection frame discussed above.

Method 500 may perform operation 510 during which it may be determined if one or more peer devices has been reset in response to receiving the NAV reset signal. Accordingly, during operation 510, the wireless device may determine if the peer devices have successfully received the NAV reset signal, which may be a CF-End frame, and have successfully reset their NAV timers. In various embodiments, such a determination may be made based on whether or not an acknowledgement of receipt has been received from each peer device.

If it has been determined that the peer devices have not successfully reset their NAV timers, method 500 may proceed to operation 514 during which legacy coexistence operations, such as TDM operations may be used. If it has been determined that the peer devices have successfully reset their NAV timers, method 500 may proceed to operation 512.

Accordingly, method 500 may perform operation 512 during which it may be determined if additional data should be transmitted. Thus, the wireless device may determine if additional data should be transmitted over the communications medium, as may be identified with medium access grant and RF active signals associated with the first and second transceivers. If it is determined that additional data should be transmitted, method 500 may return to operation 502 to listen for an assertion of an RF active signal. If it is determined that no additional data should be transmitted, method 500 may terminate.

Figure 6:
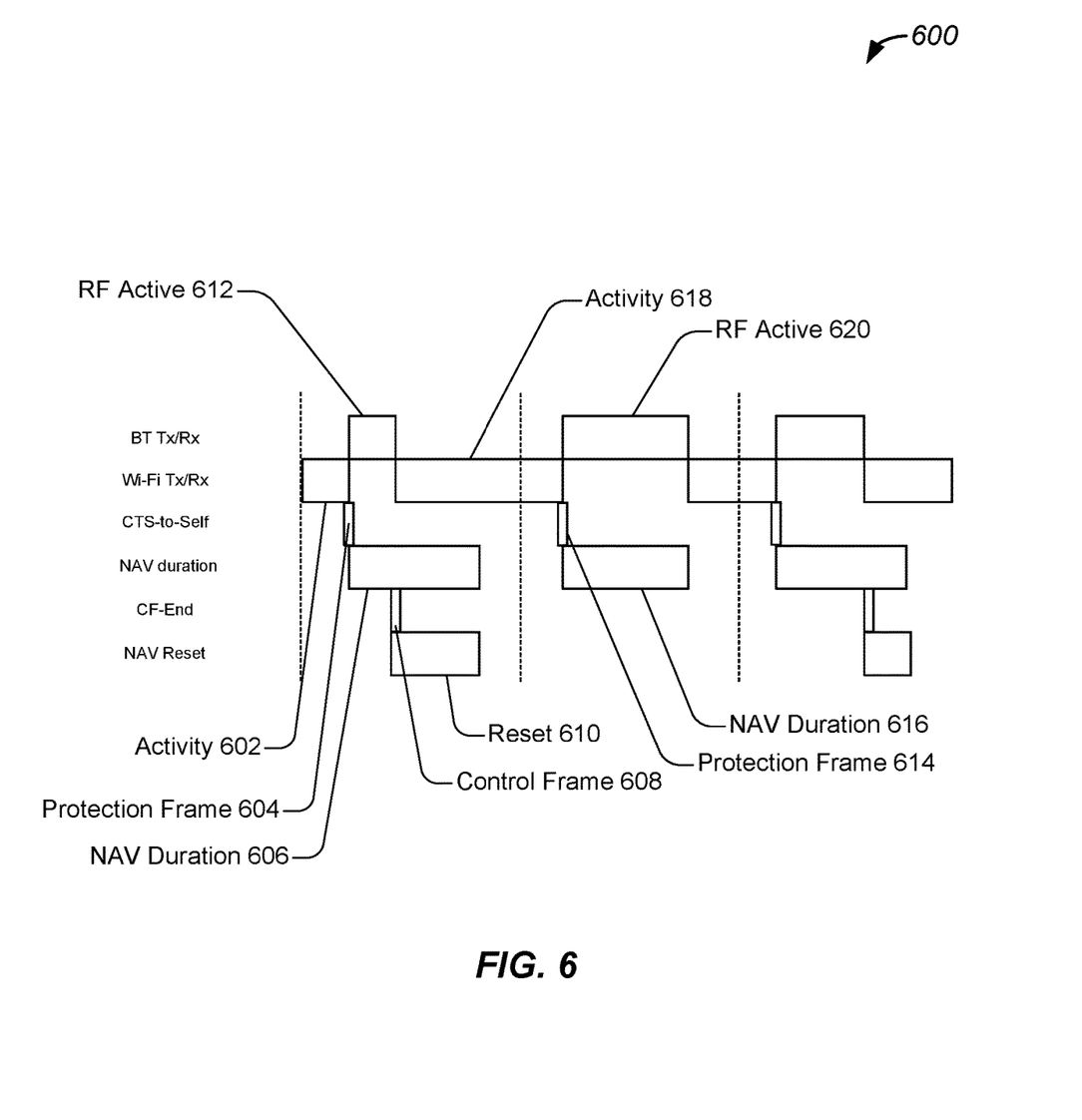
FIG. 6 illustrates an example of timing diagram of coexistence techniques, performed in accordance with some embodiments.

FIG. 6 illustrates an example of timing diagram of coexistence techniques, performed in accordance with some embodiments. As shown in diagram 600, different periods of activity of a wireless device may have different communications medium allocation properties. More specifically, in a first period shown in diagram 600, wireless activity, such as activity 602, may be present at a first transceiver, and medium access may be granted to the first transceiver. Moreover, RF active signal 612 may be generated for a second transceiver when the second transceiver has data to send or receive. Accordingly, protection frame 604 may be generated and sent, and medium access may be granted to the second transceiver. Moreover, a period of time specified by the duration field of the protection frame may specified during which medium access is to be granted to the second transceiver and suspended for the first transceiver, as shown by NAV duration 606. As shown in diagram 600, activity of the second transceiver may terminated, and RF active signal 612 may terminated. In response to RF active signal 612 terminating, control frame 608 may be generated and transmitted to peer devices. During a period of time, such as reset 610, the NAV timers of the devices may be reset, and medium access may be returned to the first transceiver, as shown by activity 618. As shown in diagram 600, the reset occurs before the termination of NAV duration 606. In this way, communications medium access is returned to the first transceiver faster, and efficiency of the communications medium usage is increased.

In another period shown by diagram 600, activity 618 continued until RF active signal 620 is asserted and protection frame 614 is generated. As shown in diagram 600, NAV duration 616 is specified. In this example, because RF active signal 620 terminates at the same time as NAV duration 616, and the second transceiver has been active for the entire duration, no control frame is generated and no NAV reset is performed.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   identifying, using a processing device, an assertion of a radio frequency (RF) active signal;
   canceling activity of a first transceiver in response to identifying the assertion of the RF active signal, the RF active signal being associated with a second transceiver collocated with the first transceiver; and
   generating, using the processing device, a network allocation vector (NAV) reset signal in response to identifying a de-assertion of the RF active signal, the NAV reset signal resetting a timer of a wireless device in which the first transceiver and the second transceiver are collocated, the generating of the NAV reset signal further comprising generating a control frame in response to identifying the de-assertion of the RF active signal.

2. The method of claim 1 further comprising:
   generating a protection frame in response to identifying the assertion of the RF active signal.

3. The method of claim 2, wherein the generating of the control frame is triggered by a termination of the RF active signal.

4. The method of claim 3, wherein the protection frame is a CTS-to-Self frame, and wherein the control frame is a CF-End frame.

5. The method of claim 4, wherein the CTS-to-Self frame comprises a duration field identifying a period of time for which activity of the first transceiver is suspended.

6. The method of claim 4, further comprising:
   resetting a NAV timer in response to receiving the CF-End frame.

7. The method of claim 6, wherein the generating of the NAV reset signal comprises:
   transmitting the CF-End frame to a plurality of peer devices.

8. The method of claim 7 further comprising:
   resetting NAV timers of the plurality of peer devices.

9. The method of claim 1, wherein the first transceiver is compatible with a Wi-Fi communications protocol, and wherein the second transceiver is compatible with a Bluetooth protocol.

10. A system comprising:
    a first transceiver configured to be compatible with a first wireless communications protocol;
    a second transceiver collocated with the first transceiver and configured to be compatible with a second wireless communications protocol; and
    processing elements coupled to the first transceiver and the second transceiver, the processing elements being configured to:
      identify an assertion of a radio frequency (RF) active signal associated with the second transceiver;
      cancel activity of the first transceiver in response to identifying the assertion of the RF active signal; and
      generate a NAV reset signal in response to identifying a de-assertion of the RF active signal, the NAV reset signal resetting a timer associated with the first transceiver, the generating of the NAV reset signal further comprising generating a control frame in response to identifying the de-assertion of the RF active signal.

11. The system of claim 10, wherein the processing elements are further configured to:
    generate a protection frame in response to identifying the assertion of the RF active signal; and
    wherein the generating of the control frame is triggered by a termination of the RF active signal.

12. The system of claim 11, wherein the protection frame is a CTS-to-Self frame, wherein the control frame is a CF-End frame, and wherein the CTS-to-Self frame comprises a duration field identifying a period of time for which activity of the first transceiver is suspended.

13. The system of claim 12, wherein the processing elements are further configured to:
    reset a NAV timer in response to receiving the CF-End frame.

14. The system of claim 12, wherein the processing elements are further configured to:
    transmit the CF-End frame to a plurality of peer devices, wherein the plurality of peer devices is configured to reset their NAV timers in response to receiving the CF-End frame.

15. The system of claim 10, wherein the first transceiver is configured to be compatible with a Wi-Fi communications protocol, and wherein the second transceiver is configured to be compatible with a Bluetooth protocol.

16. A device comprising:
    processing elements configured to:
      identify an assertion of a radio frequency (RF) active signal;
      cancel activity of a first transceiver in response to identifying the assertion of the RF active signal, the RF active signal being associated with a second transceiver collocated with the first transceiver; and
      generate a NAV reset signal in response to identifying a de-assertion of the RF active signal, the NAV reset signal resetting a timer of a wireless device in which the first transceiver and the second transceiver are collocated, the generating of the NAV reset signal further comprising generating a control frame in response to identifying the de-assertion of the RF active signal.

17. The device of claim 16, wherein the processing elements are further configured to:
    generate a protection frame in response to identifying the assertion of the RF active signal; and
    wherein the generating of the control frame is triggered by a termination of the RF active signal.

18. The device of claim 17, wherein the protection frame is a CTS-to-Self frame, wherein the control frame is a CF-End frame, and wherein the CTS-to-Self frame comprises a duration field identifying a period of time for which activity of the first transceiver is suspended.

19. The device of claim 18, wherein the processing elements are further configured to:
    reset a NAV timer in response to receiving the CF-End frame.

20. The device of claim 18, wherein the processing elements are further configured to:
    transmit the CF-End frame to a plurality of peer devices, wherein the plurality of peer devices is configured to reset their NAV timers in response to receiving the CF-End frame.

* * * * *